United States Patent [19]
Göbel et al.

[11] Patent Number: 5,654,391
[45] Date of Patent: Aug. 5, 1997

[54] AQUEOUS DISPERSION BASED ON POLYMER/POLYURETHANE RESINS, PROCESS FOR THE PRODUCTION THEREOF, COATING COMPOSITIONS AND USE THEREOF

[75] Inventors: Armin Göbel, Hasslinghausen; Hans-Peter Patzschke, Wuppertal, both of Germany

[73] Assignee: Herberts GmbH, Wuppertal, Germany

[21] Appl. No.: 425,284

[22] Filed: Apr. 20, 1995

[30] Foreign Application Priority Data

Apr. 21, 1994 [DE] Germany .................. 44 13 737.0

[51] Int. Cl.$^6$ .................................................. C08G 18/08
[52] U.S. Cl. ................... 528/71; 528/45; 524/591; 525/123; 252/182.26; 252/182.27
[58] Field of Search ................... 528/45, 71; 524/591; 525/123; 252/182.24, 182.26, 182.27

[56] References Cited

U.S. PATENT DOCUMENTS 5,331,039  7/1994  Blum et al. ................ 524/507

FOREIGN PATENT DOCUMENTS

| 0272346 | 6/1988 | European Pat. Off. . |
| 0510572 | 10/1992 | European Pat. Off. . |
| 4127680A1 | 2/1992 | Germany . |
| 4226270A1 | 2/1994 | Germany . |
| 4-103614 | 4/1992 | Japan . |
| 5-186543 | 7/1993 | Japan . |

OTHER PUBLICATIONS

Chemical Abstracts, vol. 120, No. 2, Jan. 24, 1994, Columbus, OH, Abstract No. 33027, "Aqueous Acrylic Polyurethanes Coating Material"—JP05/86543; Jul., 1993.

Abstract; 4–103614; Japan Aug. 24, 1990.

G. Oertel; Polyurethane Handbook; Hanser Publishers, New York, 1985; pp. 22–25.

*Primary Examiner*—Rachel Gorr
*Attorney, Agent, or Firm*—Keck, Mahin & Cate

[57] ABSTRACT

Aqueous binder dispersions for aqueous coating compositions, which are stable in storage and have good applicational properties. The dispersions are obtainable by joint chain extension of

- one or more polyurethanes containing no urea groups, bearing ionic groups or groups convertible into ionic groups, having substantially terminal OH groups and having a number average molar mass ($M_n$) of 1,000 to 10,000, an acid value of 5 to 50 and an OH value of 5 to 50 and
- II. one or more polymers containing hydroxyl groups based on ethylenically unsaturated monomers, having an acid value of 0 to 20, an OH value of 150 to 400 and a number average molar mass ($M_n$) of 2,000 to 20,000, wherein the molar ratio of the hydroxyl groups of component I to those of component II is 1:6 to 1.0:0.5, with
- III. one or more diisocyanates, in a molar ratio of the OH groups from components I and II to the NCO groups of component III of 1.05:1 to 10:1, in an anhydrous medium, neutralisation of at least a proportion of the groups present which are convertible into ionic groups and conversion of the resultant product into the aqueous phase.

19 Claims, No Drawings

AQUEOUS DISPERSION BASED ON POLYMER/POLYURETHANE RESINS, PROCESS FOR THE PRODUCTION THEREOF, COATING COMPOSITIONS AND USE THEREOF

FIELD OF THE INVENTION

This invention relates to aqueous binder dispersions based on polymers containing hydroxyl groups, ethylenically unsaturated monomers and polyurethane resins containing no urea groups and containing carboxyl and hydroxyl groups, which are subjected to joint chain extension. The invention also relates to the process for the production thereof and to aqueous coating compositions which may be produced therefrom, which are in particular suitable as base lacquers or topcoat lacquers.

BACKGROUND OF THE INVENTION

In the automotive industry, metal and plastic components are provided with multilayer coatings. These Coatings are intended to protect the substrates from corrosion, but are also intended to have a good decorative effect. Such coatings are generally multilayer coatings based on a primer and one or more subsequent layers, for example base lacquer layers, topcoat lacquer layers, which may then be provided with a clear lacquer as a subsequent coating.

Aqueous coating compositions having low proportions of organic solvents are known. Polyurethane resin dispersions stabilised with ionic groups in the aqueous phase are likewise known.

Binder mixtures for metallic base layers are known from DE-A-41 15 948 which consist of special polyurethane elastomers, polyester resins and amino resins and which optionally contain polymeric, crosslinked acrylate microgels. These mixtures of binders and acrylate microparticles may then be further processed to yield multilayer lacquer coatings. EP-A-0 379 158 describes thermoplastic coating compositions based on polyurethanes which are stabilised by means of ionic groups, together with up to 12% of acrylate resins as an added component. These are then used to coat plastic substrates.

DE-A-41 09 477 describes polyurethane dispersions based on polyester/isocyanate reaction products stabilised by ionic groups, which products are optionally chain-extended. After the addition of up to 80% of acrylate resins, reactive film adhesives may be produced therefrom.

All these known coating compositions based on mixtures of acrylate and polyurethane resins have the disadvantage that they occasion problems relating to storage stability. Moreover, there are often problems of intercoat adhesion if further subsequent layers are applied.

JP-A-04 103614 describes urethane/acrylic copolymers. These are produced by preparing a urethane prepolymer containing urea groups in the form of an aqueous dispersion. Acrylic monomers are polymerised in this aqueous dispersion. The resultant aqueous dispersion is reacted with an isocyanate prepolymer. Due to the manner of their production, the resultant copolymers are non-homogeneous and may lead to compatibility problems when used in coating compositions, which may also result in reduced storage stability and turbidity and in compatibility problems with other binder components, such as for example polyesters.

DE-A-26 63 307 describes the emulsion polymerisation of vinyl monomers in polyurethane dispersions. These dispersions are also used to produce coatings. They are produced by emulsion polymerisation in polyurethane dispersions, i.e. it is principally a mixture of pure acrylate polymers which is produced. Such polymer dispersions are also described in DE-A-37 22 005. They have the disadvantage that storage stability and intercoat adhesion problems occur here too. Furthermore, the necessary external emulsifiers lead to poor water resistance when used in multilayer lacquer coatings.

SUMMER OF THE INVENTION

The object of the present invention is to provide aqueous binder dispersions based on polyurethanes and polymers based on ethylenically unsaturated monomers, which dispersions have good storage stability, good applicational properties in coating compositions, in particular in metallic lacquers, together with good intercoat adhesion with subsequent lacquer coatings. They should also have excellent weathering resistance, particularly when used in single layer topcoat lacquers.

This object is achieved by providing an aqueous emulsion, in particular containing no emulsifier, of crosslinkable polymer/polyurethane resins containing hydroxyl groups. This aqueous dispersion according to the invention is obtainable by joint chain extension of I. one or more polyurethanes containing no urea groups, bearing ionic groups or groups convertible into ionic groups, having substantially terminal OH groups and having a number average molar mass ($M_n$) of 1,000 to 10,000, an acid value of 5 to 50 and an OH value of 5 to 50 and II. one or more polymers containing hydroxyl groups based on ethylenically unsaturated monomers, having an acid value of 0 to 20, an OH value of 150 to 400 and a number average molar mass ($M_n$) of 2,000 to 20,000, wherein the molar ratio of the hydroxyl groups of component I to those of component II is 1:6 to 1.0:0.5, with III. one or more diisocyanates, in a molar ratio of the OH groups from components I and II to the NCO groups of component III of 1.05:1 to 10:1, in an anhydrous medium, neutralisation of at least a proportion of the groups present which are convertible into ionic groups and conversion of the resultant product into the aqueous phase.

The binder dispersion according to the invention obtained in this manner may be further processed optionally with the addition of further binders, crosslinking agents, pigments and/or extenders together with customary lacquer additives to yield aqueous coating compositions.

The present invention also provides the process described below for the production of the dispersions according to the invention, together with the aqueous coating compositions which may be produced therefrom, which are described below.

The dispersion according to the invention is below termed the acrylate/polyurethane dispersion. It contains reaction products of acrylate polymers containing no urea groups and containing hydroxyl groups with functionalised polyurethane resins and isocyanates, but no fractions of free, unreacted acrylate polymers. These are dispersions which contain no urea groups.

DETAILED DESCRIPTION OF THE PREFERRED EMBODIMENTS

Polyurethanes containing no urea groups which may be used as component I are those, for example, known as functionalised polyurethane binders. These are polyurethane resins which may optionally be converted into the aqueous phase by means of neutralised ionic groups. They additionally contain at least two isocyanate-active groups, by means of which they may enter into further reactions. OH groups are particularly preferred. Such polyurethane binders are described, for example, in DE-A-43 23 896, DE-A-42 28 510, DE-A-42 24 617, in EP-A-0 089 497 and DE-A-40 00 889.

These are generally binders which may be produced on the basis of polyester polyols, polycarbonate polyols and/or polyether polyols, in particular diols, which are reacted, optionally using low molecular weight, optionally polyfunctional hydroxyl compounds, di- or polyisocyanates together with compounds which are difunctional with respect to isocyanate, which form no urea groups, which have ionic groups or substituents which are convertible into ionic groups. Prepolymers containing isocyanate groups or hydroxyl groups may here be formed, which are optionally chain-extended. The aromatic or aliphatic polyester, polyether polyol units customary in lacquer chemistry may here be used. The aromatic, preferably aliphatic isocyanates customary in lacquer chemistry may likewise also be used. The components selected are conveniently those which are known to be as resistant to weathering as possible and which exhibit no tendency to yellowing.

The component I polyurethane polymers containing no urea groups which may be used according to the invention should have a molar mass ($M_n$) of 1,000 to 10,000. They should preferably have hydroxyl groups with an OH number of between 5 and 50, in particular above 10 and below 40. Other reactive groups, for example SH, NH, may also be present. They should bear ionic groups or substituents which are convertible into ionic groups, in particular groups which are convertible into anionic groups, such as sulphonic acid, phosphonic acid or carboxylic acid groups. Sterically hindered carboxylic acid groups are preferred. The acid value should be between 5 and 50, in particular below 30; this ensures stable dispersion of the binders in the aqueous phase, after neutralisation of at least a proportion of the these groups. It is optionally possible for a proportion of other polar, hydrophilic groups also to be present in the molecule. These promote the stabilisation of the aqueous dispersion. The polyurethane polyols are preferably of a linear structure.

Component I may be produced in various manners. It is thus possible, on the one hand, to proceed with a deficit of isocyanate groups, wherein OH-functional polyurethane polyols are directly obtained. These may optionally be chain-extended with isocyanates. It is, however, also possible to proceed with an excess of isocyanates; in this manner, isocyanate-terminated polyurethane prepolymers are obtained. These may be chain-extended by reaction with diols or other isocyanate-reactive compounds, during which no urea groups are formed. Another possibility is to produce polyurethane prepolymers containing OH groups which additionally have CH-acid groups in the molecule. These resins may then be chain-extended by means of the CH-acid groups, for example with aldehydes.

Component I may be produced and stored separately. Preferably, however, it is produced and further reacted in stages.

The component I polyurethane polyols are generally synthesised in anhydrous form. It is possible, in order to reduce viscosity, to add organic solvents which do not react with isocyanate groups. The solvents selected at this point are preferably those which lead to no disruptive effects in the coating composition once converted into the aqueous phase. Water-miscible solvents are particularly suitable. It is optionally possible to reduce the quantity of solvents by distillation.

Known polymers may be used as component II. These are polymers based on unsaturated monomers, which may also optionally have further reactive groups. Polyhydroxyacrylate resins are preferred. They are preferably produced by solution polymerisation using known processes. Polymerisation may, for example, proceed by a free-radical or ionic reaction, for example at temperatures of between 30° and 140° C., for example in non-reactive solvents. Ethylenically unsaturated monomers which may be considered are virtually any free-radically polymerisable monomers. Various properties of the polyacrylate polymer, such as for example glass transition temperature, solubility and reactivity, may be influenced by the selection of the monomers.

Examples of unsaturated monomers are acrylic acid alkyl esters, methacrylic acid alkyl esters, maleic acid and/or fumaric acid dialkyl esters, wherein the alkyl residue is in each case a linear or branched or cycloaliphatic $C_1$ to $C_{15}$ alkyl residue. Examples of further copolymerisable monomers are styrene or substituted styrenes, vinyl toluene, (meth) acrylamide and/or (meth) acrylonitrile. (Meth)acrylic is here taken to mean acrylic and/or methacrylic. Examples of copolymerisable functional monomers are (meth) acrylic acid alkylamides with $C_2$ to $C_8$ alkyl residues; the corresponding monomers containing hydroxyl groups, for example (meth)acrylic acid hydroxyalkyl esters, are also copolymerised in order to achieve the desired OH values. These preferably contain at least some secondary hydroxyl groups. Examples of such compounds are acrylic acid and methacrylic acid esters of 1,2-alkanediols with 1 to 12 carbon atoms, for example hydroxypropyl (meth) acrylate, hydroxybutyl (meth)acrylate together with hydroxyalkyl (meth) acrylamides. Further compounds which may be copolymerised are, for example, allyl alcohol, monovinyl ethers of polyols. The resultant polymeric resins should be of a substantially linear structure. Small proportions of polyunsaturated monomers are possible.

The resultant polymeric resins should have a number average molar mass of 2,000 to 20,000, in particular of below 10,000. These are preferably polyhydroxy compounds with a functionality of above 5, particularly preferably of above 10, OH groups per molecule with an OH value of 150 to 400, preferably of 200 to 350. The acid value of the polymeric resins should be between 0 and 20, in particular the acid value should be less than 5, particularly preferably under 2 and in particular under 1. The resultant resins should be of a largely linear structure and preferably contain no crosslinks. The resultant resins may be dissolved in organic solvents. Care should be taken to ensure that these solvents are not reactive with isocyanates. It is preferred if the molar mass of the resins is generally above that of the component I polyurethane polyols.

Organic polyisocyanates, in particular diisocyanates, which are known for the production of polyurethanes may be used as component III. Aliphatic, aromatic and/or cycloaliphatic isocyanates, in particular cycloaliphatic isocyanates may be used. Examples of such isocyanates are trimethylene diisocyanate, tetramethylene diisocyanate, pentamethylene diisocyanate, hexamethylene diisocyanate, propylene diisocyanate, ethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-tolylene diisocyanate, 2,6-tolylene diisocyanate, 1-isocyanato-methyl-5-isocyanato-1,3,3-trimethylcyclohexane bis-(4-isocyanatocyclohexyl) methane, bis-(4-isocyanatophenyl)-methane, 4,4-diisocyanatodiphenyl ether, 1,5-dibutyl-pentamethylene diisocyanate, tetramethylxylylene diisocyanate, 2,3-bis-(8-isocyanatooctyl)-4-octyl-5-hexylcyclohexane. Polyisocyanates in which the functionality in excess of 2 has been blocked may also be used.

A proportion of known tri- and polyfunctional lacquer polyisocyanates may be used as the polyisocyanate. These are, for example, reaction products of diisocyanates to yield oligomers such as, for example, isocyanurates, allophanates, biurets or reaction products with polyfunctional alcohols.

The binder fraction of the dispersion according to the invention is produced by mixing component I with component II, optionally an inert organic solvent and component III. Components I and II are here mixed with component III in such a manner that, in molar terms, a mixture ratio of the total OH groups to the NCO groups of 1.05:1 to 10:1, preferably of 1.5 to 8.5:1 is produced. The resultant product is thus OH-functional. The mixture ratios of component I and of component II are selected such that, in molar terms, the ratio of the hydroxyl groups of I:II is between 1:6 and 1:0.5. The ratio is preferably between 1:4 and 1:1.

The method used at this point may be that polyurethane component I is produced by reacting a diisocyanate with the NCO-reactive compounds which form no urea groups and contain ionic groups. These products are then reacted with a diol structural unit, for example a polyester/polyether diol structural unit, optionally together with a low molecular weight polyol and optionally further isocyanate to yield the polyurethane diol. It is, however, also possible to perform this reaction which forms component I in a single stage reaction.

The isocyanate component, together with, simultaneously or subsequently, the polymer containing hydroxyl groups of the olefinically unsaturated compound, are then added to this polyurethane structural unit. The mixture is thoroughly homogenised and the viscosity optionally adjusted with solvents. A different sequence of adding the components is, however, also possible.

Another method of synthesis involves adding larger quantities of the component III isocyanate to the diol structural unit, for example the polyester structural unit, during direct synthesis of component I and then adding the polyacrylate component II to this reaction mixture. This method may thus pass via an isocyanate-terminated intermediate.

In order to accelerate the reaction with the isocyanate, it may optionally be favourable to raise the temperature or to add suitable catalysts, for example customary tertiary amines or customary organotin compounds. On completion of the reaction, the reaction product is partially or entirely neutralised, unless it already contains a sufficient quantity of ionic groups.

The resultant product preferably has a number average molar mass of approximately 5,000 to 100,000. The crosslinked fraction comprises in particular 1 to 20%, preferably 3 to 15%, particularly preferably 4 to 8% relative to the solids weight of the sample. The crosslinked fraction is the insoluble fraction in tetrahydrofuran. The fraction is determined by extracting a sample having approximately 0.3 g of solid resin with approximately 30 ml of tetrahydrofuran. After separation of the tetrahydrofuran, the insoluble portions are dried for 30 minutes at 150° C. and weighed. It has many OH groups. The acid value should preferably be below 30.

Neutralising agents for acidic groups capable of forming anions which may be considered are, for example, known organic amines or ammonia. These are primary, secondary, in particular tertiary amines, which may optionally also bear further functional groups. Dialkylalkanol amines or alkyldialkanol amines are in particular also suitable. They may be added to the organic binder solution (the reaction product resulting from I, II and III) or they are incorporated as an aqueous solution. Once thoroughly homogenised, the neutralised product may be diluted with water. A stable, low-viscosity dispersion is produced in this manner.

It may optionally be necessary to remove the organic solvent used during production. This may, for example, be achieved by distillation. This may be accelerated by the application of reduced pressure. In particular, the solvents which should be distilled out of the binder dispersion are those giving rise to disruptive properties on use as a lacquer binder.

On the other hand, it may be favourable to add further specially selected organic solvents in order to influence the properties of the dispersion. It is thus, for example, possible to increase the stability or water-miscibility of the binder dispersion by adding at least partially water-miscible organic solvents, for example glycols or glycol ethers. Such solvents may moreover accelerate levelling of the coating composition.

Organic coating compositions may be produced from the aqueous binder dispersions according to the invention. These may be either physically drying or chemically crosslinking. To this end, it is possible to add further binders and/or optionally crosslinking resins to the binder dispersions. These may either be in aqueous form or they are added in the form of an organically dissolved binder. The quantity of the additional binders and crosslinking agents may be up to 50 wt.% relative to the total binder (resin solids).

The further additional binder components present in the coating composition may, for example, be water-borne polyester resins and/or water-borne polyacrylate resins and/or acrylated polyester resins, together with further reactive or non-functional polyurethane dispersions of a different type, optionally together with customary crosslinking agents, such as melamine resins and/or phenolic resins and/or blocked polyisocyanates.

Water-borne polyesters are, for example, those having free carboxyl groups, i.e. polyesters with an elevated acid value. These are customary known polyesters based on polyols and polycarboxylic acids, which still contain free carboxyl groups and optionally hydroxyl groups. The water-borne polyacrylate resins may, in the same way as the polyester resins described above, also contain free carboxyl groups and optionally hydroxyl groups. These are generally acrylic or methacrylic copolymers, wherein the carboxyl groups originate from the acrylic or methacrylic acid fractions.

Additional polyurethane dispersions may, for example, be taken to be those described in DE-A-36 28 125. These are anionically stabilised polyurethane dispersions, which are produced by the reaction of polyols, diisocyanates, ionic compounds and chain extension with amines.

Amine resins suitable as crosslinking agents are, for example, hydrophilic or hydrophobic condensation products produced by reacting aminotriazines and amidotriazines with aldehydes. Amines or compounds bearing amino groups such a melamine, guanamine, acetoguanamine, benzoguanamine, dicyandiamide or urea are condensed in the presence of alcohols such as methanol, ethanol, propanol, butanol or hexanol with aldehydes, in particular formaldehyde, using known industrial processes. Examples of such resins and the production thereof are described in Houben-Weyl, *Methoden der organischen Chemie* 1963, page 357.

Blocked polyisocyanates may also be used as the crosslinking agent. Any desired polyisocyanates may be used in which the isocyanate groups have been reacted with an isocyanate-reactive, fugitive monofunctional compound. Any desired polyisocyanates suitable for crosslinking may be used for production of the blocked polyisocyanate, for example those already described in III.

Customary blocking agents, for example any desired aliphatic, cycloaliphatic or aromatic alkylmonoalcohols or oximes, such as methyl ethyl ketone oxime, acetone oxime and cyclohexanone oxime,-together with caprolactams, phenols and hydroxamic acid esters may be used to block the polyisocyanates. Malonic esters or acetoacetic esters are preferred blocking agents. In order to improve emulsifiability, a proportion of the blocking agent may consist of polyalkylene monoethers, in particular polyethylene monoalkyl ethers.

In two-component coating compositions, the crosslinking agents are added to the dispersion immediately before application. Unblocked isocyanates are preferably used in this case. These are known, being, for example, the di- and polyisocyanates customary in lacquers mentioned in III.

The coating composition may also contain customary lacquer additives, for example agents influencing rheological properties, such as highly disperse silica, phyllosilicates or polymeric urea compounds; thickeners, anti-settling agents, levelling agents, light stabilisers, anti-foaming agents, such as for example compounds containing silicone; wetting agents together with adhesion promoters. Wetting agents are also taken to include known paste reins, as are for example described in DE-A-40 00 889, which may be used to improve pigment dispersion and grinding. Catalysts may also be added to accelerate hardening, but it is also possible to harden using thermal energy without a catalyst.

Suitable solvents which are present in small quantities are customary lacquer solvents which may originate from production of the binder or may be added separately.

Pigments which may be added are customary organic or inorganic coloured pigments, such as quinacridones, perylenes and phthalocyanines or carbon black, titanium dioxide or iron oxide pigments, transparent pigments, for example micronised titanium dioxide, micronised barium sulphate or silicon dioxide, together with extenders. Single-tone lacquers are preferably produced with these coloured pigments. Effect pigments, such as metallic pigments, may also be added. Metallic base lacquers are preferably produced from these.

The production methods for the coating compositions according to the invention are known. For example, the pigments and/or extenders may be dispersed and ground in a proportion of the binder dispersion, the wetting agents or of aqueous or conventional paste binders. These pigment preparations are emulsified into the aqueous binder dispersion. Further lacquer constituents may then be added. The solids content and pH value of the coating composition are optionally adjusted.

The binders may be used to produce aqueous coating compositions, for example for coloured base layers, surfacers or stone impact protection layers or single-tone topcoat lacquers. The binders are particularly suitable for the production of aqueous base lacquers.

The coating compositions produced from the polyurethane dispersions according to the invention may be applied using known processes, for example by impregnation, flow coating or spraying. The films are then physically dried or chemically crosslinked, for example as a one-component material or crosslinked at room temperature as two-component systems. Single layer and multilayer lacquer coatings may be produced. Substrates which are customary in the automotive industry, such as steel, aluminum, plastic components, may for example be coated. The aqueous dispersion according to the invention is distinguished by excellent compatibility with other binder components such as polyesters etc. The coating compositions according to the invention yield stable, optically perfect coatings with good intercoat adhesion and elevated resistance to chemicals and weathering.

EXAMPLES

| Abbreviations: | |
| --- | --- |
| Methyl ethyl ketone | MEK |
| Methyl isobutyl ketone | MIBK |
| Isophorone diisocyanate | IPDI |
| N-Methylpyrrolidone | NMP |
| Dimethylolpropionic acid | DMPA |
| Hydroxypropyl acrylate | HPA |
| Trimethylolpropane | TMP |
| Dibutyltin dilaurate | DBTL |
| Dimethylisopropanolamine | DMIPA |
| Butyl methacrylate | BMA |
| Butyl acrylate | BA |
| Hydroxyethyl acrylate | HEA |

| Final values determined under practical conditions: | |
| --- | --- |
| Solids: | 1 hour's drying at 150° C. to DIN |
| Viscosity: | measured at 50% solids in MIBK (23° C.) |
| OH value: | mg KOH/g solids |
| Acid value: | mg KOH/g solids |
| Water: | deionised water |
| Molar mass: | number average ($M_n$) |

Determination of non-soluble, crosslinked binder fractions

A sample containing approximately 0.3 g of solid resin is weighed out into a conical flask on an analytical balance.

30 ml of tetrahydrofuran is added as solvent.

The conical flask is sealed with a glass stopper and stirred for 30 minutes with a magnetic stirrer.

The complete contents of the flask are then rinsed into a previously weighed centrifuge tube, centrifuged for 30 minutes at 21,000 rpm and the supernatant phase decanted.

The centrifuge tube with the centrifugate is dried for 30 minutes at 150° C. in a drying cabinet. Once it has cooled to room temperature, it is weighed on the analytical balance to an accuracy of 0.1 mg.

Evaluation of measurement:

$$\%B = \frac{A \times 100\%}{E}$$

B=insoluble crosslinked fraction in %
A=final weight in g
C=initial weight of solid resin in g The polyester used is a customary commercial polyester with an OH value of 105 and a molar mass of 1,000 g/mol.

The initiator used is a customary commercial initiator, tert.-butyl peroctoate.

A. Intermediates

PRODUCTION EXAMPLE A1

433 g of butyl acetate are heated to 110° C. A mixture consisting of 399 g of HEA, 601 g of BA and 7.5 g of initiator is then added dropwise within 4 hours. The temperature is then maintained for one hour and a further 2.5 of initiator are then added. Once the batch has been maintained at 110° C. for a further hours, it is cooled and discharged.

| | |
|---|---|
| Solids: | 69.1% |
| Viscosity: | 1,010 mPa · s |
| OH value: | 200 |

PRODUCTION EXAMPLE A2

536 g of MIBK are heated to 110° C. A mixture consisting of 644 g of BMA, 128 g of BA, 464 g HEA and 10 g of initiator is then added dropwise within 4 hours. The temperature is then maintained for one hour and a further 5 g of initiator are then added. Once the batch has been maintained at 110° C. for a further hour, it is cooled and discharged.

| | |
|---|---|
| Solids: | 71.7% |
| Viscosity: | 1,200 mPa · s |
| OH value: | 174 |

PRODUCTION EXAMPLE A3

1797 g of MIBK are heated to 100° C. A mixture consisting of 3320 g of HPA, 830 g of BA and 41 g of initiator is then added dropwise within 4 hours.

The temperature is then maintained for one hour and the mixture combined with 12 g of initiator. Once the batch has been maintained at 110° C. for a further hour, it is cooled and discharged.

| | |
|---|---|
| Solids: | 68.6% |
| Viscosity: | 210 mPa · s |
| OH value: | 292 |

B. Dispersions

EXAMPLE B4

A mixture of 220 g of DMPA, 3,385 g of MEK, 1,683 g of NMP is heated to 80° C. Once the DMPA as dissolved, the mixture is cooled to 50° C. and 888 of IPDI are added. The mixture is heated to 80° C. until an NCO value of 3.3% is achieved. The temperature is then adjusted to 50° C. and 3,249 g of polyester and 20 g of TMP are added. The temperature is then maintained at 80° C. until all the isocyanate has reacted (NCO value of less than 0.3%). At 50° C., 927 of A1, 222 g of IPDI and 7 g of DBTL are together added and heated to 80° C. Once an NCO value of 0.3% is achieved, 270 g of DMIPA solution (50% water) are added at 50° C. After half an hour, 11,318 g of water are added dropwise in 10 minutes. The temperature is raised to 85° C. under a vacuum, wherein the MEK and butyl acetate are distilled off.

A white dispersion is produced.

| | |
|---|---|
| Solids: | 34.0% |
| Acid value: | 21.5 |
| pH value: | 7.4 |
| Crosslinked fraction: | 3.3% |

EXAMPLE B5

220 g of DMPA, 3,385 g of MEK, 1,683 g of NMP are introduced into a vessel and heated to 80° C. Once the DMPA has dissolved, the mixture is cooled to 50° C. and 888 g of IPDI are added. The mixture is heated to 80° C. until an NCO value of 3.2% is achieved. The mixture is then cooled to 50° C. and 3,249 g of polyester and 20 g of TMP are added. The temperature is then maintained at 80° C. until the isocyanate has reacted. At 50° C., 980 g of A2, 222 g of IPDI and 7 g of DBTL are added in a single portion and heated to 80° C. Once an NCO value of 0.3% is achieved, the mixture is cooled to 50° C. and 270 g of DMIPA solution (50%) are added. After 15 minutes, 8,414 g of water are added dropwise in 20 minutes. The temperature is raised to 80° C. under a vacuum, wherein the MEK and MIBK are distilled off.

A white, stable dispersion is produced.

| | |
|---|---|
| Solids: | 35.4% |
| Acid value: | 20.2 |
| pH value: | 7.5 |
| Crosslinked fraction: | 2.5% |

EXAMPLE B6

265 g of DMPA, 3,020 g of acetone and 1,657 g of NMP are introduced into a vessel and heated to 60° C. Once the DMPA has dissolved, 888 g of IPDI are added at 50° C. The temperature is then raised to 65° C. until an NCO value of 2.9% is achieved. 3,160 g of polyester and 17 g of TMP are added at 50° C. The temperature is then again maintained at 65° C. until the isocyanate has completely reacted (NCO value of less than 0.3%). At 50° C., 933 g of A3, 222 g of IPDI and 5 of DBTL are added in a single portion and heated to 65° C. At an NCO value of 0.4%, the mixture is cooled to 50° C. and 367 g of DMIPA solution (50%) are added. After 10 minutes, 7,628 g of water are added dropwise in 10 minutes. The temperature is raised to 85° C. under a vacuum, wherein the acetone and MIBK are distilled off.

A white, stable dispersion is produced.

| | |
|---|---|
| Solids: | 38.9% |
| Acid value: | 23.2 |
| pH value: | 8.4 |
| Crosslinked fraction: | 5.1% |

EXAMPLE B7

2,809 g of polyester, 17 g of TMP, 174 g of DMPA, 645 of A3 and 636 g of NMP are introduced into a vessel and heated to 80° C. Once the DMPA has dissolved, the mixture is cooled to 50° C. and 888 g of IPDI are added. The mixture is heated to 80° C. and maintained at that level, with the addition of 636 g of NMP, until an NCO value of 0.3% is achieved. At 50° C., 222 g of IPDI and 5 g of DBTL are added and heated to 80° C. 2,924 g of MEK are added and the reaction continued until an NCO value of 0.4% is reached. At 50° C., 240 g of DMIPA solution (50%) are added. After 3 minutes, 510 g of water are added. At 3 minute intervals, 669 g, 669 g, 1,337 g , 2,006 g and 2,006 g portions of water are then added. The temperature is raised to 80° C. under a vacuum, wherein the MEK and MIBK are distilled off.

A white dispersion is produced.

| | |
|---|---|
| Solids: | 32.0% |
| Acid value: | 20.2 |
| pH value: | 7.8 |
| Crosslinked fraction: | 4.2% |

EXAMPLE B8

189 g of DMPA, 3,030 g of MEK and 1,292 of NMP are introduced into a vessel and heated to 80° C. Once the DMPA has dissolved, 888 g of IPDI are added at 50° C. The temperature is then raised to 80° C. until an NCO value of 4.2% is achieved. 2,784 g of polyester and 16 g of TMP are then added at 50° C. The temperature is then again maintained at 80° C. until the isocyanate value is less than 0.3%. At 50° C., 222 g of IPDI and 5 g of DBTL are added in a single portion and heated to 80° C. Once an NCO value of 0.9% is achieved, the mixture is cooled to 50° C. and 853 g of A3 are added. The temperature is then maintained at 80° C. until an NCO value of 0.3% is achieved, before adding 232 g of DMIPA solution (50%). After 20 minutes, 7,098 g of water are added dropwise in 15 minutes. The temperature is raised to 85° C. under a vacuum, wherein the MEK and MIBK are distilled off.

A dispersion is produced.

| | |
|---|---|
| Solids: | 35.2% |
| Acid value: | 19.7 |
| pH value: | 8.3 |
| Crosslinked fraction: | 3.5% |

EXAMPLE B9

174 g of DMPA, 6,891 g of acetone are introduced into a vessel and heated to 70° C. Once the DMPA has dissolved, 888 g of IPDI are added at 50° C. The temperature is then maintained at 70° C. until an NCO value of 2.8% is achieved. At 50° C., 2,843 g of polyester and 17 g of TMP are added. The temperature is then maintained at 70° C. until the NCO value is less than 0.3%. At 50° C., 1,093 g of A3 and 222 of IPDI and 5 g of DBTL are added and reacted at 65° C. until an NCO value of 0.3% is achieved, cooled to 50° C. and 213 g of DMIPA solution (50%) are added. After 15 minutes, 9,331 g of water are added dropwise in 10 minutes. The temperature is raised to 85° C. under a vacuum, wherein the acetone and MIBK are distilled off.

A white, stable dispersion is produced which has very good drying characteristics.

| | |
|---|---|
| Solids: | 40.1% |
| Acid value: | 18.2 |
| pH value: | 7.5 |

EXAMPLE B10

174 g of DMPA and 1,493 of NMP are introduced into a vessel and heated to 80° C. Once the DMPA has dissolved, the mixture is cooled to 50° C. and 578 of IPDI are added. The reaction is continued at 80° C. until an NCO value of 5.1% is achieved. At room temperature, 2,809 g of polyester and 17 of TMP, 2,129 g of MEK and 1,173 g of A3 are added, wherein the acrylate had previously been separately reacted with IPDI to an NCO value of 12%. At 80° C., the reaction is continued until an NCO value of less than 0.4% is achieved. At 50° C., 222 g of IPDI and 6 g of DBTL are added in a single portion and reacted at 80° C. to an NCO value of 0.3%, 214 g of DMIPA solution (50%) are added at 70° C. After 20 minutes, 7,439 g of water are added dropwise in 20 minutes. The temperature is raised to 85° C. under a vacuum, wherein the MEK and MIBK are distilled off.

| | |
|---|---|
| Solids: | 32.4% |
| Acid value: | 19.6 |
| Crosslinked fraction: | 2.9% |

Metallic base lacquers and single-tone base lacquers are produced from the dispersion. These exhibit a good metallic effect and good intercoat adhesion to the subsequent clear lacquer layer.

EXAMPLE B11

72 g of DMPA, 951 g of polyester, 407 g of NMP and 924 g of acetone are introduced into a vessel and heated to 65° C. Once the DMPA has dissolved, the mixture is cooled to 50° C. and 142 g of IPDI and 1.5 g of DBTL are then added. The temperature is then raised to 65° C. and maintained at this level until an NCO value of less than 0.3% is achieved. At 50° C., a further 36 g of IPDI are added, the temperature raised to 65° C. and maintained at this level for two hours. At 50° C., 250 g of acrylate resin intermediate A3 are then added and maintained at 65° C. until an NCO value of less than 0.3% is achieved. Once this value has been achieved, the mixture is cooled to 50° C. and 134 g of DMIPA solution (50%) are added. After 15 minutes, 2,085 g of water are added dropwise in 15 minutes. The temperature is raised to 85° C. under a vacuum, wherein the acetone and MIBK are distilled off.

Final dispersion values

| | | |
|---|---|---|
| Solids | 34.7% | |
| Acid value | 25.4 | |
| pH value | 8.7 | |
| OH value | 100 | mg KOH/g (relative to solid resin) |
| Crosslinked fraction: | 4.8% | |

EXAMPLE B12

65 g of DMPA, 789 g of polyester, 365 g of NMP and 866 g of acetone are introduced into a vessel and heated to 65° C. Once the DMPA has dissolved, the mixture is cooled to 50° C. and 237 g of IPDI and 1.4 g of DBTL are then added. The temperature is then raised to 65° C. and maintained at this level until an NCO value of less than 0.3% is achieved. At 50° C., a further 71 g of IPDI are added, the temperature raised to 65° C. and maintained at this level for 2 hours. At 50° C., 455 g of acrylate resin intermediate A3 are then added and maintained at 65° C. until an NCO value of less than 0.3% is achieved. The mixture is then cooled to 50° C. and 95 g of DMIPA solution (50%) are added. After 15 minutes, 2,357 of water are added dropwise in 15 minutes. The temperature is raised to 85° C. under a vacuum, wherein the acetone and MIBK are distilled off.

Final dispersion values:

| | |
|---|---|
| Solids: | 37.3% |
| Acid value: | 21.9 |
| pH value: | 8.3 |
| OH value: | 45 mg KOH/g (relative to solid resin) |
| Crosslinked fraction: | 5.4% |

What is claimed is:

1. Aqueous binder dispersion obtained by joint chain extension of
   I. one or more polyurethanes containing no urea groups, bearing ionic groups or groups convertible into ionic groups, having substantially terminal OH groups and having a number average molar mass ($M_n$) of 1,000 to 10,000, an acid value of 5 to 50 and an OH value of 5 to 50, and
   II. one or more polymers containing hydroxyl groups made from ethylenically unsaturated monomers, having an acid value of 0 to 20, an OH value of 150 to 400 and a number average molar mass ($M_n$) of 2,000 to 20,000, wherein the molar ratio of the hydroxyl groups of component I to those of component II is 1:6 to 1.0:0.5, with
   III. one or more diisocyanates, in a molar ratio of the OH group from components I and II to the NCO groups of component III of 1.05:1 to 10:1, in an anhydrous medium, neutralisation of at least a proportion of the groups present which are convertible into ionic groups and conversion of resultant product into an aqueous phase.

2. Process for producing aqueous binder dispersions, comprising:
   I. combining one or more polyurethanes containing no urea groups, bearing ionic groups or groups convertible into ionic groups, having substantially terminal OH groups and having a number average molar mass ($M_n$) of 1,000 to 10,000, an acid value of 5 to 50 and an OH value of 5 to 50, together with
   II. one or more polymers containing hydroxyl groups made from ethylenically unsaturated monomers, having an acid value of 0 to 20, an OH value of 150 to 400 and a number average molar mass ($M_n$) of 2,000 to 20,000, wherein the molar ratio of the hydroxyl groups of component I to those of component II is 1:6 to 1.0:0.5, and subjecting the combination of I and II to chain extension in an anhydrous medium by reacting with
   III. one or more diisocyanates, in a molar ratio of the OH groups from components I and II to the NCO groups of component III of 1.05:1 to 10:1, and neutralizing at least a proportion of the groups present which are convertible into ionic groups, and converting resultant product into an aqueous phase.

3. Dispersion according to claim 1, wherein the component I polyurethanes are produced starting from at least one member selected from the group consisting of polyester polyols, polycarbonate polyols and polyether polyols.

4. Dispersion according to claim 1, wherein the component II polymers are copolymers containing hydroxyl groups of at least one member selected from the group consisting of acrylic acid alkyl esters and methacrylic acid alkyl esters.

5. Dispersion according to claim 1, wherein the component II polymers have an acid value of below 5.

6. Dispersion according to claim 1, wherein the component II polymers have an OH functionality of above 5 OH groups per molecule.

7. Dispersion according to claim 1, wherein the dispersion contains no emulsifier.

8. Dispersion according to claim 1, wherein binders obtained have a number average molar mass of 5,000 to 100,000 and an acid value of below 30.

9. Aqueous coating composition containing an aqueous dispersion according to claim 1.

10. Coating composition according to claim 9, comprising at least one member selected from the group consisting of additional binders and crosslinking agents.

11. A multilayer coating comprising an aqueous dispersion according to any one of claims 1 or 3 to 8.

12. A multilayer coating according to claim 11 comprising an automotive coating.

13. A multilayer coating comprising a coating composition according to any one of claims 9 or 10.

14. A multilayer coating according to claim 13, comprising an automotive coating.

15. A process according to claim 2, wherein the component I polyurethanes are produced starting from at least one member selected from the group consisting of polyester polyols, polycarbonate polyols and polyether polyols.

16. A process according to claim 2, wherein the component II polymers are copolymers containing hydroxyl groups of at least one member selected from the group consisting of acrylic acid alkyl esters and methacrylic acid alkyl esters.

17. A process according to claim 2, wherein the component II polymers have an acid value of below 5.

18. A process according to claim 2, wherein the component II polymers have an OH functionality of above 5 OH groups per molecule.

19. A process according to claim 2, comprising carrying out the process in the absence of external emulsifiers.

* * * * *